United States Patent [19]

Schläfer et al.

[11] Patent Number: 5,102,993

[45] Date of Patent: Apr. 7, 1992

[54] WATER-SOLUBLE DISAZO COMPOUNDS, HAVING A FIBER-REACTIVE GROUP OF THE VINYLSULFONE SERIES, SUITABLE AS DYESTUFFS

[75] Inventors: Ludwig Schläfer, Kelkheim; Hartmut Springer, Königstein/Taunus, both of Fed. Rep. of Germany

[73] Assignee: Hoechst Aktiengesellschaft, Frankfurt am Main, Fed. Rep. of Germany

[21] Appl. No.: 605,937

[22] Filed: Oct. 30, 1990

Related U.S. Application Data

[63] Continuation of Ser. No. 470,085, Jan. 25, 1990, abandoned.

[30] Foreign Application Priority Data

Jan. 27, 1989 [DE] Fed. Rep. of Germany ....... 3902371

[51] Int. Cl.$^5$ ................ C09B 62/533; D06P 1/384
[52] U.S. Cl. .................................. 534/642; 534/641
[58] Field of Search .................... 534/640, 641, 642

[56] References Cited

U.S. PATENT DOCUMENTS

| | | | |
|---|---|---|---|
| 3,334,961 | 8/1967 | Kuhne et al. | 534/641 |
| 4,818,814 | 4/1989 | Schlafer et al. | 534/641 X |

FOREIGN PATENT DOCUMENTS

| | | | |
|---|---|---|---|
| 1262213 | 3/1968 | Fed. Rep. of Germany | 534/641 |
| 42-15010 | 8/1967 | Japan | 534/641 |
| 875946 | 8/1961 | United Kingdom | 534/641 |

*Primary Examiner*—Mary C. Lee
*Assistant Examiner*—Fiona T. Powers

[57] ABSTRACT

Water-soluble disazo compounds, processes for their preparation of their use as dyestuffs Disazo compounds of the general formula (1) defined below,

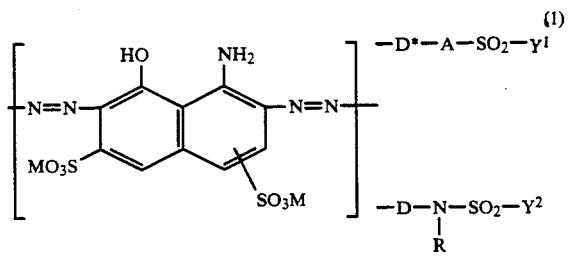

which have fiber-reactive properties and are suitable as useful dyestuffs for dyeing material containing carboxamide groups and/or material containing hydroxy groups, such as fiber material, for example wool and cellulose fiber materials, are described.

In formulas (1):
  D* is phenylene, which can be substituted by 1 or 2 substituents from the group comprising lower alkyl, lower alkoxy, chlorine, bromine, sulfo and carboxy, or is a naphthylene which is optionally substituted by sulfo;
  D is the meta- or para-phenylene radical;
  A is a direct bond or the methylene group or the group —N(R)—, where R has the meaning given below;
  R is lower alkyl, which can be substituted;
  $Y^1$ and $Y^2$ each denote the vinyl group or the β2-chloroethyl or β-sulfatoethyl group and
  M is a hydrogen atom or an alkali metal.

18 Claims, No Drawings

WATER-SOLUBLE DISAZO COMPOUNDS, HAVING A FIBER-REACTIVE GROUP OF THE VINYLSULFONE SERIES, SUITABLE AS DYESTUFFS

This application is a continuation of copending application Ser. No. 07/470,085, filed on Jan. 25, 1990, now abandoned.

German Patent No. 1,262,213 discloses, in Example 9, a navy blue disazo dyestuff having 1-amino-8-naphthol-3,6-disulfonic acid as the bivalent coupling component and two aniline diazo components, the diazo components both possessing a $\beta$-sulfatoethyl-sulfonamide group as the fiber-reactive grouping. A dyestuff of the same structure but containing the N-methyl-N-($\beta$-sulfatoethyl-sulfonyl)-amide group, and the vinylsulfonamide derivative thereof are known from Example 11 of German Auslegeschrift No. 1,235,257 and U.S. Pat. No. 3,334,961. Dyestuffs of similar structure are known from Examples 7 and 8 of European Patent Application Publication No. 0,219,080 A.

Improved navy blue disazo compounds which have fiber-reactive dyestuff properties, exhibit a constant color yield when used in exhaustion dyeing processes at dyeing temperatures between 40° and 80° C. and are particularly suitable for use in pad dyeing processes, in which they already have a high color yield and a high degree of fixing at room temperature, have now been found with the present invention. These compounds are also particularly suitable for use in the one-phase printing process because of their stability in alkaline printing pastes and their high color yield.

The disazo compounds according to the invention correspond to the general formula (1)

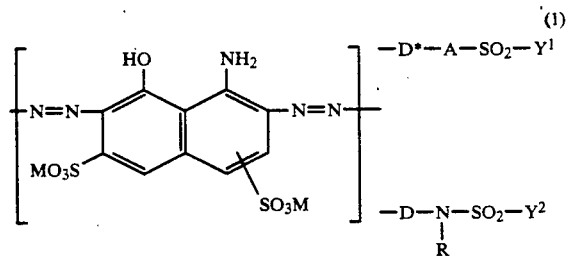

in which:

D* is a phenylene radical, preferably a meta- or para-phenylene radical, which can be substituted by 1 or 2 substituents from the group comprising alkyl having 1 to 4 carbon atoms, such as ethyl or in particular methyl, alkoxy having 1 to 4 carbon atoms, such as ethoxy or in particular methoxy, chlorine, bromine, sulfo or carboxy, or is a naphthylene radical, which can be substituted by 1 or 2 sulfo groups;

D is the meta- or para-phenylene radical;

A is a direct bond or the methylene group or a bivalent amino group of the formula —N(R)— where R has one of the meanings given below;

R is an alkyl gorup having 1 to 4 carbon atoms, such as the ethyl or in particular the methyl group, which can be substituted, for example by a cyano or a carbalkoxy group having 2 to 5 carbon atoms, such as the carbomethoxy or carbethoxy group, for example the $\beta$-cyanoethyl or $\beta$-carbomethoxyethyl group;

$Y^1$ and $Y^2$ each denote the vinyl group or the $\beta$-chloroethyl or $\beta$-sulfatoethyl group, it being possible for $Y^1$ and $Y^2$ to have meanings which are identical to or different from one another; and M is a hydrogen atom or an alkali metal, such as lithium, potassium or sodium.

Disazo compounds according to the invention are accordingly also those which correspond to the general formulae (1a) and (1b)

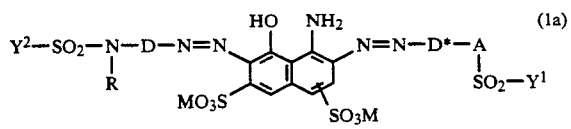

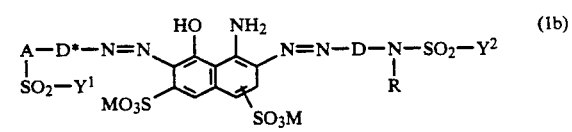

in which M, D*, D, A, R, $Y^1$ and $Y^2$ have the abovementioned particularly preferred meanings.

The individual formula members of the general formulae (1) can be identical to or different from one another within their meanings. D* is preferably a meta- or para-phenylene radical, which can be substituted by 1 or 2 substituents chosen from the following group of substitutents: 2 methoxy, 1 ethoxy, 1 methyl, 2 chloro and 1 sulfo. Particularly preferably, D* is the p-phenylene radical and A is a direct bond. D* is furthermore preferably a naphthylene radical, in the 2-position of which the azo group is bonded and which can be substituted by a sulfo group, in addition to the grouping —A—$SO_2$—$Y^1$.

Preferably, both $Y^1$ and $Y^2$ represent a $\beta$-sulfatoethyl group.

The substituents "sulfo", "carboxy" and "sulfato" include both the acid form thereof and the salt form thereof. Sulfo groups accordingly denote groups corresponding to the general formula —$SO_3M$, carboxy groups denote groups corresponding to the general formula —COOM and sulfato groups correspondingly denote groups of the general formula —$OSO_3M$, in each case where M has the abovementioned meaning.

The novel compounds of the general formula (1) can be present in acid form. They are preferably in the form of their alkali metal salts and are preferably used in the form of the alkali metal salts for dyeing (including printing) fiber materials containing hydroxy groups and fiber materials containing carboxamide groups.

The present invention furthermore relates to a process for the preparation of the disazo compounds according to the invention, which comprises coupling the diazonium compounds of the amines of the general formulae (2) and (3)

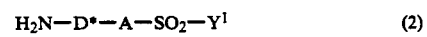
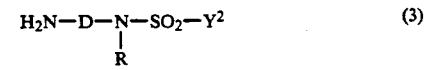

in which D*, D, A, R, $Y^1$ and $Y^2$ have the abovementioned meanings, with 1-amino-3,6- or -4,6-disulfo-8-naphthol as the bivalent coupling component in any desired sequence, the first coupling reaction being carried out in a strongly acid aqueous medium, such as at a pH between 0 and 2, preferably between 1 and 1.5, and the second coupling reaction being carried out in a weakly acid to weakly alkaline aqueous medium, such as at a pH between 4 and 8, preferably between 4.5 and 7. The coupling temperature is as a rule between 0° and 30° C., preferably between 10° and 20° C.

Examples of aromatic amines of the general formula (2) are 4-[N-methyl-N-(β-sulfatoethylsulfonyl)]-amino-aniline, 3-[N-methyl-N-(β-sulfatoethylsulfonyl)]-aminoaniline, 6-sulfo-4-[N-methyl-N-(β-sulfatoethylsulfonyl)]-amino-aniline, 6-sulfo-3-[N-methyl-N-(β-sulfatoethylsulfonyl)]-amino-aniline, 4-[N-ethyl-N-(β-sulfatoethylsulfonyl)]-amino-aniline, 3-[N-ethyl-N-(β-sulfatoethylsulfonyl)]-amino-aniline, 4-chloro-3-[N-ethyl-N-(β-sulfatoethylsulfonyl)]-amino-aniline, 4-methoxy-3-[N-ethyl-N-(β-sulfatoethylsulfonyl)]-amino-aniline, 2-chloro-5-[N-ethyl-N-(β-sulfatoethylsulfonyl)]-amino-aniline, 2-trifluoromethyl-4-[N-ethyl-N-(β-sulfatoethylsulfonyl)]-amino-aniline, 3-methoxy-4-[N-methyl-N-(β-sulfatoethylsulfonyl)]-aniline, 2,5-dimethoxy-4-[N-methyl-N-(β-sulfatoethylsulfonyl)]-aniline, 3-[N-(β-cyanoethyl)-N-(β'-sulfatoethylsulfonyl)]-amino-aniline, 4-[N-(β-cyanoethyl)-N-(β'-sulfatoethylsulfonyl)]-amino-aniline, 4-chloro-3-[N-methyl-N-(β'-sulfatoethylsulfonyl)]-amino-aniline, 3-chloro-4-[N-methyl-N-(β'-sulfatoethylsulfonyl)]-amino-aniline, 4-methoxy-3-[N-methyl-N-(β-sulfatoethylsulfonyl)]-amino-aniline, 2-methoxy-3-[N-methyl-N-(β-sulfatoethylsulfonyl)]-amino-aniline, 4,6-dimethyl-3-[N-methyl-N-(β-sulfatoethylsulfonyl)]-amino-aniline, 2-chloro-5-[N-methyl-N-(β-sulfatoethylsulfonyl)]-amino-aniline, 4-(β-sulfatoethylsulfonyl)-aniline, 6-sulfo-4-(β-sulfatoethylsulfonyl)-aniline, 4-vinylsulfonyl-aniline, 3-(β-sulfatoethylsulfonyl)-aniline, 3-sulfo-4-(β-sulfatoethylsulfonyl)-aniline, 3-vinylsulfonyl-aniline, 2-methoxy-5-(β-sulfatoethylsulfonyl)-aniline, 2-methoxy-5-vinylsulfonyl-aniline, 4-methoxy-5-(β-sulfatoethylsulfonyl)-aniline, 2-methoxy-4-(β-sulfatoethylsulfonyl)-aniline, 2,5-dimethoxy-4-(β-sulfatoethylsulfonyl)-aniline, 2,5-dimethoxy-4-vinylsulfonyl-aniline, 2,4-dimethoxy-5-(β-sulfatoethylsulfonyl)-aniline, 2-methoxy-5-methyl-4-(β-sulfatoethylsulfonyl)-aniline, 2-methoxy-5-methyl-4-vinylsulfonyl, 2-methoxy-5-chloro-4-(β-sulfatoethylsulfonyl)-aniline, 2-chloro-5-(β-sulfatoethylsulfonyl)-aniline, 2,6-dichloro-4-(β-sulfatoethylsulfonyl)-aniline, 2-bromo-4-(β-sulfatoethylsulfonyl)-aniline, 2-carboxy-5-(β-sulfatoethylsulfonyl)-aniline, 2-sulfo-4-(β-sulfatoethylsulfonyl)-aniline, 4-(β-sulfatoethylsulfonyl)-1-amino-naphthalene, 5-(β-sulfatoethylsulfonyl)-1-amino-naphthalene, 6-(β-sulfatoethylsulfonyl)-sulfatoethylsulfonyl)-2-amino-naphthalene, 7-(β-sulfatoethylsulfonyl)-2-amino-naphthalene, 8-(β-sulfatoethylsulfonyl)-2-amino-naphthalene, 6-(β-sulfatoethylsulfonyl)-1-sulfo-2-amino-naphthalene, 8-(β-sulfatoethylsulfonyl)-6-sulfo-2-amino-naphthalene, 6-(β-sulfatoethylsulfonyl)-8-sulfo-2-amino-naphthalene, 3-(β-sulfatoethylsulfonyl-methyl)-aniline and 4-(β-sulfatoethylsulfonyl-methyl)-aniline.

Examples of aromatic amines of the general formula (3) are 4-[N-methyl-N-(β-sulfatoethylsulfonyl)]-amino-aniline, 3-[N-methyl-N-(β-sulfatoethylsulfonyl)]-amino-aniline, 4-(N-methyl-N-vinylsulfonyl)-amino-aniline, 3-(N-methyl-N-vinylsulfonyl)-amino-aniline, 4-[N-ethyl-N-(β-sulfatoethylsulfonyl)]-amino-aniline, 3-[N-ethyl-N-(β-sulfatoethylsulfonyl)]-amino-aniline, 4-[N-(β-cyanoethyl)-N-(β'-sulfatoethylsulfonyl)]-amino-aniline, 3-[N-(β-cyanoethyl)-N-(β'-sulfatoethylsulfonyl)]-amino-aniline, 4-[N-(β-carbomethoxy-ethyl)-N-(β'-sulfatoethylsulfonyl)]-amino-aniline and 3-[N-(β-carbomethoxy-ethyl)-N-(β'-sulfatoethylsulfonyl)]-amino-aniline.

The compounds according to the invention can be isolated from their preparation mixtures by generally known methods for water-soluble compounds, thus, for example, by precipitation from the reaction medium by means of an electrolyte, such as, for example, sodium chloride or potassium chloride, or by evaporation of the reaction solution itself, for example by spray drying.

If the last type of isolation mentioned is chosen for the compounds according to the invention, in cases where the reaction solution contains relatively large amounts of sulfate it is advisable for the sulfate present in the solutions to be removed, for example by precipitation as calcium sulfate and removal by filtration, before the evaporation. In some cases, it may also be desirable to put the dyestuff solution to use directly for dyeing as a liquid preparation, if appropriate after concentration and/or addition of buffer substances.

The novel compounds of the present invention are outstandingly suitable as dyestuffs, in particular as fiber-reactive dyestuffs, for dyeing or printing materials of fibers containing hydroxy and/or carboxamide groups, such as, in particular, of natural or regenerated cellulose or of naturally occurring, regenerated or synthetic polyamides or polyurethanes, such as, for example, cotton, hemp, linen, jute, filament viscose, wool, silk, polyamide-6, polyamide-6,6, polyamide-11 or polyamide-4. The novel compounds are particularly suitable for dyeing and printing cellulose fiber materials.

The novel compounds are applied to and fixed on the substrates mentioned by dyeing and printing processes analogous to those which are known and customary for water-soluble, in particular fiber-reactive, dyestuffs. They have a good to very good solubility and stability in the printing pastes and dyebaths, exhibit a high tinctorial strength and a good color build-up and produce, with high degrees of fixing, navy blue to black dyeings and prints which, especially in the case of dyeings and prints on cellulose fibers, are distinguished by good to very good fastness properties during use and fabrication, such as, for example, fastnesses to light, washing, seawater, chlorinated water, acid and alkali, fastnesses to cross-dyeing, fastnesses to alkaline and acid perspiration, fastnesses to exhaust gases (fastness to nitric oxide) and fastnesses to ironing, pleating, decatizing, dry cleaning and rubbing. Non-fixed portions of dyestuff can easily be washed out. The dyeings and prints of the compounds according to the invention also have a good stability towards copper ions and towards substances which donate copper ions. When compounds according to the invention are used for printing cellulose fiber materials, hardening of the handle of the dyed material is moreover avoided; sharp contours with a clear white background are furthermore obtained by printing. The dyeings and prints produced with the compounds according to the invention do not stain when laid down and plaited down in the non-fixed state and do not bleed and have a high resistance to acid storage, and thus exhibit no "acid fading".

However, the very good fastnesses to light in the wet and dry state are to be particularly emphasized. Very good wet light-fastnesses are found on exposure to light of dyeings and prints which have been impregnated with distilled water, with drinking water and with alkaline and acid perspiration solutions. These wet light-fastnesses have since acquired a high practical value.

The present invention furthermore relates to the use of the compounds according to the invention for dyeing or printing the abovementioned fiber materials and to a process for dyeing or printing the abovementioned fiber materials in which the compounds according to the invention are applied to and then fixed on the fiber material by procedures which are analogous to those which are known and customary in the dyeing and printing industry. For example, these processes are carried out by treating cellulose fiber materials in an aqueous dyebath, which contains customary dyeing auxiliaries if appropriate, by the exhaustion process using alkaline agents, that is to say at a temperature between 15° and 105° C. and preferably between 40° and 80° C., the fiber material being dyed in very good color yields.

In particular, the dyeing temperature has only little influence on the very high degree of fixing in the temperature range between 40° and 80° C.; this results in a dyeing with a uniformly very good color yield, which is essentially independent of the dyeing temperature chosen within this temperature range.

Dyeings with excellent color yields are likewise obtained on cellulose fiber materials in particular by means of the padding processes which are known and customary in the art; this process can be carried out as a one- or two-phase process, so that fixing can be carried out with the aid of the alkaline agent which has been applied to the fiber material at the same time as or subsequently to the application of the dyestuff, or by batching of the padded fiber material for 5 minutes to 20 hours at room temperature or temperatures up to 60° C., or by steaming or by treatment with dry heat. Non-fixed portions of dyestuff can easily be washed out.

The compounds according to the invention are used in printing processes by methods which are analogous to the printing and fixing methods which are known and customary for dyeing cellulose fibers. The procedure preferably followed here is in one phase, using a printing paste containing the compound according to the invention and sodium carbonate or another acid-binding agent, such as potassium bicarbonate, sodium or potassium carbonate, sodium hydroxide solution, potassium hydroxide solution or sodium trichloroacetate, with subsequent steaming of the printed material at 101° to 103° C., or in two phases, by printing with a neutral or weakly acid printing paste containing the compound according to the invention and subsequent fixing by means of a hot electrolyte-containing alkaline bath, or by overpadding with an alkaline, electrolyte-containing liquor and subsequent batching, steaming or dry heat treatment of the overpadded material; deep prints with a good contour status and a clear white background are obtained. The prints exhibit a high constancy of shade, regardless of the fixing conditions.

Dyeing of the polyamide or polyurethane fibers is usually carried out from an acid medium. Thus, for example, acetic acid or a buffer of acetic acid and ammonium acetate can be added to the dyebath in order to obtain the desired pH. An addition of customary leveling auxiliaries, for example based on a reaction product of cyanuric chloride with three times the molar amount of an aminobenzenesulfonic acid and/or an aminonaphthalenesulfonic acid or based on a reaction product of stearylamine with ethylene oxide, is recommended for the purpose of achieving a useful levelness of the dyeings. The dyeings can be produced either at the boiling point or at 110° to 120° C.

The following Examples serve to illustrate the invention. The parts mentioned therein are parts by weight and the percentage data represent percentages by weight, unless noted otherwise. Parts by weight bear the same relationship to parts by volume as the kilogram to the liter.

The compounds described by way of their formulae in the Examples are shown in the form of the free acids; they are in general prepared and isolated in the form of their sodium or potassium salts and used for dyeing in the form of their salts. The starting compounds and components mentioned in the form of the free acid in the following Examples, in particular the Tabular Examples, can likewise be employed in the synthesis as such or in the form of their salts, preferably alkali metal salts.

The absorption maxima ($\lambda_{max}$) in the visible range stated for the compounds according to the invention were determined with the aid of the alkali metal salts thereof in aqueous solution. In the Tabular Examples, the $\lambda_{max}$ values are given in parentheses where the color shade is stated; the wavelength stated relates to nm.

EXAMPLE 1

31.9 parts of 1-amino-8-naphthol-3,6-dislulfonic acid are added to an aqueous diazonium salt solution of 4-($\beta$-sulfatoethylsulfonyl)-aniline, prepared in the customary manner by diazotization of 28.1 parts of this aniline by means of 30 parts of concentrated hydrochloric acid, 20 parts by volume of an aqueous 5N sodium nitrite solution and 200 parts of water at 0° to 5° C., and the coupling reaction is brought to completion at a pH of 0.8 to 2 and a temperature of about 10° C., while stirring for several hours.

An aqueous diazonium salt suspension, prepared in an analogous manner to the first diazonium salt, of 30.9 parts of 4-[N-methyl-N-($\beta$-sulfatoethylsulfonyl)]-amino-aniline is added to this synthesis mixture containing the monoazo intermediate compound prepared. The second coupling reaction is carried out at a pH of 6 to 7 and a temperature of 10° to 20° C.

The synthesis solution is then clarified by the customary route, for example by filtration, after addition of kieselguhr, and the disazo compound according to the invention is isolated, for example by evaporation or spray drying. The alkali metal salt (sodium salt) according to the invention of the compound of the formula

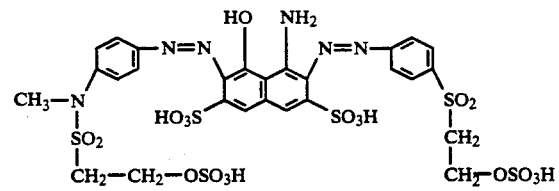

($\lambda_{max}$ = 610 nm)

is obtained in the form of a black electrolyte-containing powder. The disazo compound according to the invention has very good fiber-reactive dyestuff properties and dyes the fiber materials mentioned in the description, such as, in particular, cellulose fiber materials, for example cotton, in navy blue shades by the application and fixing methods customary in the art. The disazo compound according to the invention is also particularly suitable for use in pad dyeing processes at room temperature. The dyeings and prints obtainable with it exhibit good fastnesses during use and fabrication, of which the good light-fastnesses of the dyeings and prints in both the dry state and the state moistened with drinking water or with an aqueous perspiration solution and moreover the fastnesses to chlorine, washing and perspiration may be singled out in particular.

EXAMPLE 2

The disazo compound of Example 1 according to the invention can also be prepared in an equally good quality by adding the equivalent amount of 1-amino-8-naphthol-3,6-disulfonic acid, as the coupling component, to an equimolar mixture of the two diazonium salts in an aqueous medium, obtainable, for example, by simultaneous diazotization of the two starting amines, and initially keeping the batch at a pH of 0.8 to 1.5 and a temperature of 8° to 10° C. for several hours and then increasing the pH to 6 to 7 and allowing the reaction temperature to rise to 20° to 30° C. The second coupling reaction has then gone to completion after 2 to 3 hours. The disazo compound according to the invention is isolated in accordance with Example 1.

EXAMPLE 3

58 parts of the monoazo compound 1-amino-3,6-disulfo-2-[4'-(β-sulfatoethylsulfonyl-phenyl)]-azo-8-naphthol are added to an aqueous diazonium salt suspension of 30.9 parts of 4-[N-methyl-N-(β-sulfatoethylsulfonyl)]-amino-aniline and the coupling reaction is carried out at 10° to 30° C. and a pH of 6 to 7.

The disazo compound according to the invention is isolated in the customary manner. It is identical to that of Example 1 and exhibits the same dyestuff properties.

EXAMPLE 4

30.9 parts of 4-[N-methyl-N-(β-sulfatoethylsulfonyl)]-amino-aniline are diazotized in an aqueous medium in the customary manner, 31.9 parts of 1-amino-8-naphthol-3,6-disulfonic acid are added to the resulting diazonium salt suspension and the coupling reaction is brought to completion at a temperature of 10° C. and a pH of 1.5 to 2.5 in the course of about 24 hours.

The second coupling reaction is carried out with the diazonium salt of 28.1 parts of 4-(β-sulfatoethylsulfonyl)-aniline at a pH between 6 and 7 and a temperature between 15° and 25° C.

The disazo compound according to the invention is isolated in the customary manner and is obtained in the form of its alkali metal salt, such as the sodium salt. It has the formula, written in the form of the free acid, and exhibits very good fiber-reactive dyestuff properties. On cellulose fiber materials in particular, it produces, by the customary application and fixing processes for fiber-reactive dyestuffs, navy blue dyeings and prints with good fastnesses during fabrication and use.

EXAMPLE 5

The diazonium salt of 30.9 parts of 3-[N-methyl-N-(β-sulfatoethylsulfonyl)]-amino-aniline-6-sulfonic acid is coupled with 58 parts of the monoazo compound 1-amino-3,6-disulfo-2-[4'-(β-sulfatoethylsulfonyl-phenyl)]-azo-8-naphthol in an aqueous medium at a pH between 6 and 7 and a temperature between 10° and 30° C. The disazo compound according to the invention of the formula

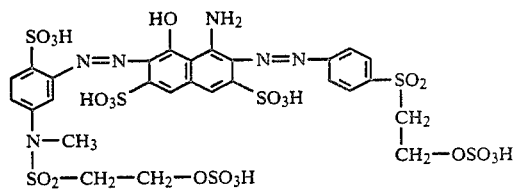

($\lambda_{max}$ = 592 nm)

is obtained in the form of the alkali metal salt. It has very good fiber-reactive dyestuff properties and dyes, for example, cellulose fibers in navy blue shades in high fixing quotas and with good fastnesses during use and fabrication, such as, in particular, with the fastnesses mentioned for the disazo compound of Example 1 according to the invention.

EXAMPLE 6

61.8 parts of 4-[N-methyl-N-(β-sulfatoethylsulfonyl)]-amino-aniline, dissolved in 500 parts of water and 65 parts of aqueous concentrated hydrochloric acid, are diazotized at 5° to 10° C. by addition of a concentrated aqueous solution of 14 parts of sodium nitrite. The batch is brought to a pH of 2.5 and 60.6 parts of 1-amino-8-naphthol-3,6-disulfonic acid are added. The first coupling reaction is carried out at a pH of 1.5 to 2 and a temperature of about 10° C. for about 20 hours, and the second coupling reaction is then carried out at a pH of 7 and a temperature of about 20° C.

After clarification of the synthesis solution, the disazo compound according to the invention is isolated by spray drying. It has the formula, written in the form of the free acid,

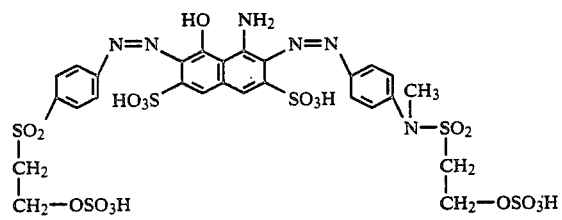

($\lambda_{max}$ = 600 nm)

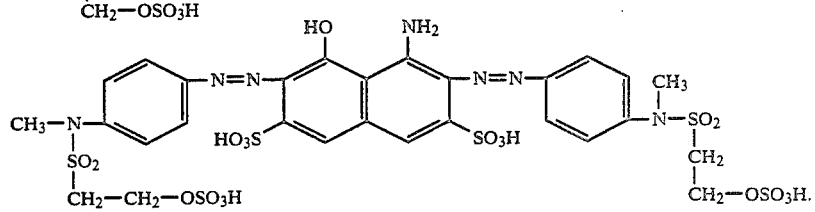

($\lambda_{max}$ = 615 nm)

It exhibits very good fiber-reactive dyestuff properties and produces, by the customary dyeing process, the exhaustion and padding process and printing processes for fiber-reactive dyestuffs, in particular on cellulose fiber materials, greenish-tinged navy blue dyeings and prints with good fastness properties in a very high color yield and with a very high degree of fixing. Of the fastness properties, those which are also mentioned for the disazo compound according to the invention and of Example 1 may be singled out in particular.

Examples 7 to 82

The following Tabular Examples contain further disazo compounds according to the invention corresponding to a general formula (A)

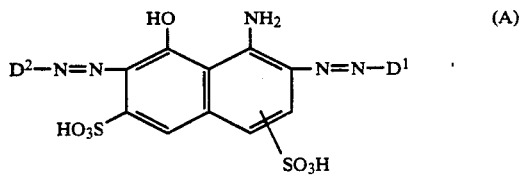

(A)

with the aid of their components, that is to say the diazo radical $D^1$ as the radical of the first diazo component $D^1$—$NH_2$ which can be coupled under strongly acid conditions, the radical $D^2$, as the second diazo component $D^2$—$NH_2$ which can be coupled under weakly acid to neutral conditions, and the bivalent coupling component 1-amino-8-naphthol-3,6- or -4,6-disulfonic acid. They can be prepared in the manner according to the invention, for example analogously to one of the above Embodiment examples with the aid of the starting compounds which can be seen from the particular Tabular Example (the 1st diazo component $D^1$—$NH_2$, the 2nd diazo component $D^2$—$NH_2$ and the corresponding bivalent coupling component). They have very good fiber-reactive dyestuff properties and produce, in particular on cellulose fiber materials by the application and fixing methods customary for fiber-reactive dyestuffs, deep, navy blue dyeings and prints with good fastness properties.

| | Disazo compound of the formula (A) | | | |
|---|---|---|---|---|
| Example | Radical $D^2$ | Position of the group —$SO_3H$ | Radical $D^1$ | Color shade |
| 7 | 3-[N-methyl-N-(β-sulfatoethyl-sulfonyl)]-amino-phenyl | 3- | 4-(β-sulfatoethyl-sulfonyl)-phenyl | navy blue (600) |
| 8 | 3-[N-ethyl-N-(β-sulfatoethyl-sulfonyl)]-amino-phenyl | 3- | 4-(β-sulfatoethyl-sulfonyl)-phenyl | navy blue (600) |
| 9 | 3-[N-(β-cyanoethyl)-(β-sulfato-ethylsulfonyl)]-amino-phenyl | 3- | 4-(β-sulfatoethyl-sulfonyl)-phenyl | navy blue (602) |
| 10 | 4-(N-methyl-N-vinylsulfonyl)-amino-phenyl | 3- | 4-(β-sulfatoethyl-sulfonyl)-phenyl | navy blue (610) |
| 11 | 3-(N-methyl-N-vinylsulfonyl)-amino-phenyl | 3- | 4-(β-sulfatoethyl-sulfonyl)-phenyl | navy blue (600) |
| 12 | 3-(N-methyl-N-vinylsulfonyl)-amino-phenyl | 3- | 4-vinylsulfonyl-phenyl | navy blue (600) |
| 13 | 4-(N-methyl-N-vinylsulfonyl)-amino-phenyl | 3- | 4-vinylsulfonyl-phenyl | navy blue (609) |
| 14 | 4-(N-methyl-N-vinylsulfonyl)-amino-phenyl | 3- | 2-sulfo-4-(β-sulfatoethyl-sulfonyl)-phenyl | navy blue (596) |
| 15 | 3-(N-methyl-N-vinylsulfonyl)-amino-phenyl | 3- | 2-sulfo-4-(β-sulfatoethyl-sulfonyl)-phenyl | navy blue (590) |
| 16 | 4-[N-methyl-N-(β-sulfatoethyl-sulfonyl)]-amino-phenyl | 3- | 2-sulfo-4-(β-sulfatoethyl-sulfonyl)-phenyl | navy blue (597) |
| 17 | 3-[N-methyl-N-(β-sulfatoethyl-sulfonyl)]-amino-phenyl | 3- | 2-sulfo-4-(β-sulfatoethyl-sulfonyl)-phenyl | navy blue |
| 18 | 3-[N-methyl-N-(β-sulfatoethyl-sulfonyl)]-amino-phenyl | 3- | 2-sulfo-5-(β-sulfatoethyl-sulfonyl)-phenyl | navy blue (594) |
| 19 | 4-[N-methyl-N-(β-sulfatoethyl-sulfonyl)]-amino-phenyl | 3- | 2-sulfo-5-(β-sulfatoethyl-sulfonyl)-phenyl | navy blue |
| 20 | 3-[N-methyl-N-(vinylsulfonyl)]-amino-phenyl | 3- | 2-sulfo-5-(β-sulfatoethyl-sulfonyl)-phenyl | navy blue (596) |
| 21 | 4-[N-methyl-N-(vinylsulfonyl)]-amino-phenyl | 3- | 2-sulfo-5-(β-sulfatoethyl-sulfonyl)-phenyl | navy blue (598) |
| 22 | 4-[N-methyl-N-(vinylsulfonyl)]-amino-phenyl | 3- | 2,5-dimethoxy-4-(β-sulfato-ethylsulfonyl)-phenyl | navy blue |
| 23 | 4-[N-methyl-N-(β-sulfatoethyl-sulfonyl)]-amino-phenyl | 3- | 2,5-dimethoxy-4-(β-sulfato-ethylsulfonyl)-phenyl | navy blue (520) |
| 24 | 3-[N-methyl-N-(β-sulfatoethyl-sulfonyl)]-amino-phenyl | 3- | 2,5-dimethoxy-4-(β-sulfato-ethylsulfonyl)-phenyl | navy blue |
| 25 | 3-(N-ethyl-N-vinylsulfonyl)-amino-phenyl | 3- | 2,5-dimethoxy-4-(β-sulfato-ethylsulfonyl)-phenyl | navy blue |
| 26 | 3-(N-ethyl-N-vinylsulfonyl)-amino-phenyl | 3- | 2-methoxy-5-methyl-4-(β-sulfatoethylsulfonyl)-phenyl | navy blue |
| 27 | 4-[N-methyl-N-(β-sulfatoethyl-sulfonyl)]-amino-phenyl | 3- | 2-methoxy-5-methyl-4-(β-sulfatoethylsulfonyl)-phenyl | navy blue (506) |
| 28 | 4-[N-methyl-N-(β-sulfatoethyl-sulfonyl)]-amino-phenyl | 3- | 6-(β-sulfatoethylsulfonyl)-naphth-2-yl | navy blue (512) |
| 29 | 3-[N-methyl-N-(β-sulfatoethyl-sulfonyl)]-amino-phenyl | 3- | 6-(β-sulfatoethylsulfonyl)-naphth-2-yl | navy blue |
| 30 | 3-[N-methyl-N-(β-sulfatoethyl-sulfonyl)]-amino-phenyl | 3- | 6-(β-sulfatoethylsulfonyl)-1-sulfo-naphth-2-yl | navy blue (510) |

-continued

| | Disazo compound of the formula (A) | | | |
|---|---|---|---|---|
| Example | Radical D² | Position of the group —SO₃H | Radical D¹ | Color shade |
| 31 | 4-[N-methyl-N-(β-sulfatoethyl-sulfonyl)]-amino-phenyl | 3- | 6-(β-sulfatoethylsulfonyl)-1-sulfo-naphth-2-yl | navy blue (514) |
| 32 | 4-[N-methyl-N-(β-sulfatoethyl-sulfonyl)]-amino-phenyl | 3- | 8-(β-sulfatoethylsulfonyl)-naphth-2-yl | navy blue |
| 33 | 3-[N-methyl-N-(β-sulfatoethyl-sulfonyl)]-amino-phenyl | 3- | 8-(β-sulfatoethylsulfonyl)-naphth-2-yl | navy blue |
| 34 | 3-[N-methyl-N-(β-sulfatoethyl-sulfonyl)]-amino-phenyl | 3- | 8-vinylsulfonyl-6-sulfo-naphth-2-yl | navy blue |
| 35 | 4-(N-ethyl-N-(β-sulfatoethyl-sulfonyl)]-amino-phenyl | 3- | 8-vinylsulfonyl-6-sulfo-naphth-2-yl | navy blue |
| 36 | 4-(N-ethyl-N-(β-sulfatoethyl-sulfonyl)]-amino-phenyl | 3- | 6-vinylsulfonyl-8-sulfo-naphth-2-yl | navy blue |
| 37 | 3-[N-methyl-N-(β-sulfatoethyl-sulfonyl)]-amino-phenyl | 3- | 8-vinylsulfonyl-6-sulfo-naphth-2-yl | navy blue |
| 38 | 3-[N-methyl-N-(β-sulfatoethyl-sulfonyl)]-amino-phenyl | 3- | 2-bromo-4-(β-sulfatoethyl-sulfonyl)-phenyl | navy blue (612) |
| 39 | 4-[N-methyl-N-(β-sulfatoethyl-sulfonyl)]-amino-phenyl | 3- | 2-bromo-4-(β-sulfatoethyl-sulfonyl)-phenyl | navy blue (620) |
| 40 | 4-[N-methyl-N-(vinylsulfonyl)]-amino-phenyl | 3- | 2-bromo-4-(β-sulfatoethyl-sulfonyl)-phenyl | navy blue (621) |
| 41 | 3-[N-methyl-N-(β-sulfatoethyl-sulfonyl)]-amino-phenyl | 4- | 4-(β-sulfatoethylsulfonyl)-phenyl | navy blue |
| 42 | 4-[N-methyl-N-(β-sulfatoethyl-sulfonyl)]-amino-phenyl | 4- | 4-(β-sulfatoethylsulfonyl)-phenyl | navy blue |
| 43 | 4-[N-methyl-N-(β-sulfatoethyl-sulfonyl)]-amino-phenyl | 4- | 2-bromo-4-(β-sulfatoethyl-sulfonyl)-phenyl | navy blue (570) |
| 44 | 3-[N-methyl-N-(β-sulfatoethyl-sulfonyl)]-amino-phenyl | 4- | 2-bromo-4-(β-sulfatoethyl-sulfonyl)-phenyl | navy blue (566) |
| 45 | 3-[N-methyl-N-(β-sulfatoethyl-sulfonyl)]-amino-phenyl | 4- | 2,5-dimethoxy-4-(β-sulfato-ethylsulfonyl)-phenyl | navy blue |
| 46 | 4-[N-methyl-N-(β-sulfatoethyl-sulfonyl)]-amino-phenyl | 4- | 2,5-dimethoxy-4-(β-sulfato-ethylsulfonyl)-phenyl | navy blue |
| 47 | 4-[N-methyl-N-(β-sulfatoethyl-sulfonyl)]-amino-phenyl | 4- | 2-sulfo-4-(β-sulfatoethyl-sulfonyl)-phenyl | navy blue (576) |
| 48 | 3-[N-methyl-N-(β-sulfatoethyl-sulfonyl)]-amino-phenyl | 4- | 2-sulfo-4-(β-sulfatoethyl-sulfonyl)-phenyl | navy blue (570) |
| 49 | 3-[N-methyl-N-(β-sulfatoethyl-sulfonyl)]-amino-phenyl | 4- | 6-(β-sulfatoethylsulfonyl)-1-sulfo-naphth-2-yl | navy blue |
| 50 | 4-[N-methyl-N-(β-sulfatoethyl-sulfonyl)]-amino-phenyl | 4- | 6-(β-sulfatoethylsulfonyl)-1-sulfo-naphth-2-yl | navy blue |
| 51 | 4-vinylsulfonyl-phenyl | 3- | 4-[N-methyl-N-(β-sulfato-ethylsulfonyl))-amino-phenyl | navy blue |
| 52 | 3-(β-sulfatoethylsulfonyl)-phenyl | 3- | 4-[N-methyl-N-(β-sulfato-ethylsulfonyl))-amino-phenyl | navy blue |
| 53 | 3-vinylsulfonyl-phenyl | 3- | 4-[N-methyl-N-(β-sulfato-ethylsulfonyl))-amino-phenyl | navy blue |
| 54 | 2-methoxy-5-(β-sulfatoethyl-sulfonyl)-phenyl | 3- | 4-[N-methyl-N-(β-sulfato-ethylsulfonyl))-amino-phenyl | navy blue |
| 55 | 2-sulfo-4-vinylsulfonyl-phenyl | 3- | 4-[N-methyl-N-(β-sulfato-ethylsulfonyl))-amino-phenyl | navy blue |
| 56 | 2-sulfo-5-vinylsulfonyl-phenyl | 3- | 4-[N-methyl-N-(β-sulfato-ethylsulfonyl))-amino-phenyl | navy blue |
| 57 | 6-(β-sulfatoethylsulfonyl)-naphth-2-yl | 3- | 4-[N-methyl-N-(β-sulfato-ethylsulfonyl))-amino-phenyl | navy blue |
| 58 | 6-(β-sulfatoethylsulfonyl)-1-sulfo-naphth-2-yl | 3- | 4-[N-methyl-N-(β-sulfato-ethylsulfonyl))-amino-phenyl | navy blue |
| 59 | 4-(β-sulfatoethylsulfonyl)-phenyl | 3- | 3-[N-methyl-N-(β-sulfato-ethylsulfonyl))-amino-phenyl | navy blue |
| 60 | 4-vinylsulfonyl-phenyl | 3- | 3-[N-methyl-N-(β-sulfato-ethylsulfonyl))-amino-phenyl | navy blue (590) |
| 61 | 2-methoxy-5-(β-sulfatoethyl-sulfonyl)-phenyl | 3- | 3-[N-methyl-N-(β-sulfato-ethylsulfonyl))-amino-phenyl | navy blue (594) |
| 62 | 2-sulfo-5-(β-sulfatoethyl-sulfonyl)-phenyl | 3- | 3-[N-methyl-N-(β-sulfato-ethylsulfonyl))-amino-phenyl | navy blue |
| 63 | 4-sulfo-5-(β-sulfatoethyl-sulfonyl)-phenyl | 3- | 3-[N-methyl-N-(β-sulfato-ethylsulfonyl))-amino-phenyl | navy blue |
| 64 | 6-(β-sulfatoethylsulfonyl)-naphth-2-yl | 3- | 3-[N-methyl-N-(β-sulfato-ethylsulfonyl))-amino-phenyl | navy blue |
| 65 | 6-(β-sulfatoethylsulfonyl)-1-sulfo-naphth-2-yl | 3- | 3-[N-methyl-N-(β-sulfato-ethylsulfonyl))-amino-phenyl | navy blue |
| 66 | 3-[N-methyl-N-(β-sulfatoethyl-sulfonyl)]-amino-phenyl | 3- | 3-[N-methyl-N-(β-sulfato-ethylsulfonyl))-amino-phenyl | navy blue |
| 67 | 3-[N-ethyl-N-(β-sulfatoethyl-sulfonyl)]-amino-phenyl | 3- | 3-[N-methyl-N-(β-sulfato-ethylsulfonyl))-amino-phenyl | navy blue |
| 68 | 4-[N-methyl-N-(β-sulfatoethyl-sulfonyl)]-amino-phenyl | 3- | 3-[N-methyl-N-(β-sulfato-ethylsulfonyl))-amino-phenyl | navy blue |
| 69 | 4-[N-ethyl-N-(β-sulfatoethyl-sulfonyl)]-amino-phenyl | 3- | 3-[N-methyl-N-(β-sulfato-ethylsulfonyl))-amino-phenyl | navy blue |

-continued

| Example | Radical $D^2$ | Position of the group —$SO_3H$ | Radical $D^1$ | Color shade |
|---|---|---|---|---|
| 70 | 4-[N-ethyl-N-($\beta$-sulfatoethyl-sulfonyl)]-amino-phenyl | 3- | 4-[N-methyl-N-($\beta$-sulfato-ethylsulfonyl)]-amino-phenyl | navy blue (612) |
| 71 | 4-[N-methyl-N-($\beta$-sulfatoethyl-sulfonyl)]-amino-phenyl | 3- | 4-[N-methyl-N-($\beta$-sulfato-ethylsulfonyl)]-amino-phenyl | navy blue (610) |
| 72 | 3-[N-methyl-N-($\beta$-sulfatoethyl-sulfonyl)]-amino-phenyl | 3- | 4-[N-methyl-N-($\beta$-sulfato-ethylsulfonyl)]-amino-phenyl | navy blue |
| 73 | 3-[N-ethyl-N-($\beta$-sulfatoethyl-sulfonyl)]-amino-phenyl | 3- | 4-[N-methyl-N-($\beta$-sulfato-ethylsulfonyl)]-amino-phenyl | navy blue |
| 74 | 4-[N-methyl-N-(vinylsulfonyl)]-amino-phenyl | 3- | 4-[N-methyl-N-(vinyl-sulfonyl)]-amino-phenyl | navy blue (614) |
| 75 | 3-[N-methyl-N-(vinylsulfonyl)]-amino-phenyl | 3- | 3-[N-methyl-N-(vinyl-sulfonyl)]-amino-phenyl | navy blue |
| 76 | 2-sulfo-3-[N-methyl-N-(vinyl-sulfonyl)]-amino-phenyl | 3- | 2-sulfo-3-[N-methyl-N-(vinylsulfonyl)]-amino-phenyl | navy blue |
| 77 | 4-($\beta$-sulfatoethylsulfonylmethyl)-amino-phenyl | 3- | 4-[N-methyl-N-($\beta$-sulfato-ethylsulfonyl)]-amino-phenyl | navy blue (610) |
| 78 | 3-($\beta$-sulfatoethylsulfonylmethyl)-amino-phenyl | 3- | 4-[N-methyl-N-($\beta$-sulfato-ethylsulfonyl)]-amino-phenyl | navy blue |
| 79 | 3-($\beta$-sulfatoethylsulfonylmethyl)-amino-phenyl | 3- | 3-[N-methyl-N-($\beta$-sulfato-ethylsulfonyl)]-amino-phenyl | navy blue |
| 80 | 4-($\beta$-sulfatoethylsulfonylmethyl)-amino-phenyl | 3- | 3-[N-methyl-N-($\beta$-sulfato-ethylsulfonyl)]-amino-phenyl | navy blue |
| 81 | 4-[N-methyl-N-($\beta$-sulfatoethyl-sulfonyl)]-aminophenyl | 3- | 4-($\beta$-sulfatoethylsulfonyl-methyl)-amino-phenyl | navy blue (602) |
| 82 | 4-[N-methyl-N-($\beta$-sulfatoethyl-sulfonyl)]-aminophenyl | 3- | 3-($\beta$-sulfatoethylsulfonyl-methyl)-amino-phenyl | navy blue (598) |

We claim:
1. A disazo compound corresponding to the formula (1)

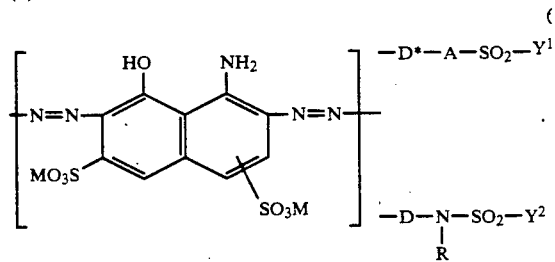

in which:
D* is phenylene, which is unsubstituted or substituted by 1 or 2 substituents from the group consisting of alkyl having 1 to 4 carbon atoms, alkoxy having 1 to 4 carbon atoms, chlorine, bromine, sulfo and carboxy, or is naphthylene, which is unsubstituted or substituted by 1 or 2 sulfo groups;
D is meta- or para-phenylene;
A is a direct bond or methylene;
R is alkyl having from 1 to 4 carbon atoms, which is unsubstituted or substituted by cyano or carbalkoxy of 2 to 5 carbons;
$Y^1$ and $Y^2$ each is vinyl, $\beta$-chloroethyl or $\beta$-sulfatoethyl, and $Y^1$ and $Y^2$ have meanings which are identical to or different from one another; and
M is hydrogen or an alkali metal.

2. A compound as claimed in claim 1, corresponding to the formula (1a)

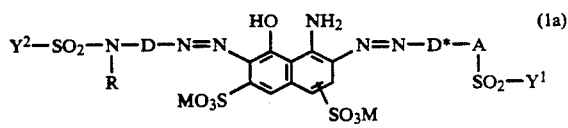

3. A compound as claimed in claim 1, corresponding to the formula (1b)

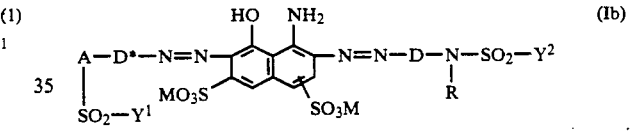

4. A compound as claimed in claim 1, in which D* is meta- or para-phenylene which is unsubstituted or substituted by 1 or 2 substituents chosen from the following group of substituents: 2 methoxy, 1 ethoxy, 1 methyl, 2 chloro and 1 sulfo.

5. A compound as claimed in claim 1, in which D* is naphthylene which contains the azo group in the 2-position and is unsubstituted or substituted by a sulfo group.

6. A compound as claimed in claim 1, in which D* is para-phenylene and A is a direct bond.

7. A compound as claimed in claim 1, in which R is methyl.

8. A compound as claimed in claim 1, in which $Y^1$ and $Y^2$ are both $\beta$-sulfatoethyl.

9. A compound as claimed in claim 2, in which D* is meta- or para-phenylene which is unsubstituted or substituted by 1 or 2 substituents chosen from the following group of substituents: 2 methoxy, 1 ethoxy, 1 methyl, 2 chloro and 1 sulfo.

10. A compound as claimed in claim 2, in which D* is naphthylene, which contains the azo group in the 2-position and is unsubstituted or substituted by a sulfo group.

11. A compound as claimed in claim 2, in which D* is para-phenylene and A is a direct bond.

12. A compound as claimed in claim 3, in which D* is meta- or para-phenylene which is unsubstituted or substituted by 1 or 2 substituents chosen from the following group of substituents: 2 methoxy, 1 ethoxy, 1 methyl, 2 chloro and 1 sulfo.

13. A compound as claimed in claim 3, in which D* is naphthylene, which contains the azo group in the 2-position and is unsubstituted or substituted by a sulfo group.

14. A compound as claimed in claim 3, in which D* is para-phenylene and A is a direct bond.

15. A compound as claimed in claim 2, in which R is methyl.

16. A compound as claimed in claim 3, in which R is methyl.

17. A disazo compound as claimed in claim 1, of the formula

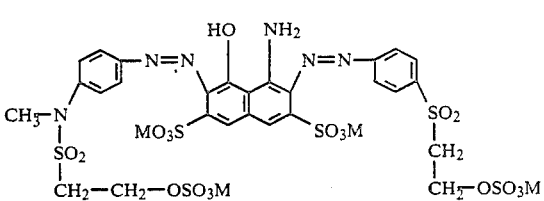

18. A disazo compound as claimed in claim 1, of the formula

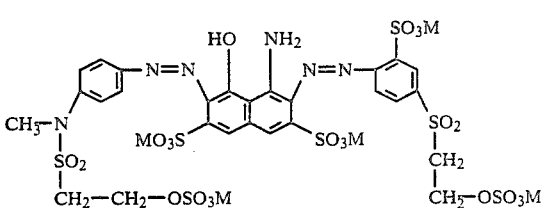

* * * * *